United States Patent
Soong et al.

(10) Patent No.: US 9,014,081 B2
(45) Date of Patent: Apr. 21, 2015

(54) SYSTEM AND METHOD FOR TRANSMITTING CONTROL INFORMATION

(75) Inventors: Anthony C. K. Soong, Plano, TX (US); Philippe Sartori, Algonquin, IL (US); Brian Classon, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 485 days.

(21) Appl. No.: 13/082,874

(22) Filed: Apr. 8, 2011

(65) Prior Publication Data

US 2011/0249640 A1 Oct. 13, 2011

Related U.S. Application Data

(60) Provisional application No. 61/322,730, filed on Apr. 9, 2010.

(51) Int. Cl.
| | |
|---|---|
| H04B 7/14 | (2006.01) |
| H04W 72/12 | (2009.01) |
| H04L 5/00 | (2006.01) |
| H04L 5/14 | (2006.01) |
| H04B 7/26 | (2006.01) |
| H04W 84/04 | (2009.01) |

(52) U.S. Cl.
CPC ......... *H04W 72/1273* (2013.01); *H04B 7/2606* (2013.01); *H04L 5/0007* (2013.01); *H04L 5/0041* (2013.01); *H04L 5/0053* (2013.01); *H04L 5/14* (2013.01); *H04W 72/1289* (2013.01); *H04W 84/047* (2013.01)

(58) Field of Classification Search
CPC ... H04L 5/0053; H04L 5/0039; H04L 5/0041; H04L 1/04; H04W 72/042
See application file for complete search history.

(56) References Cited

U.S. PATENT DOCUMENTS

| | | |
|---|---|---|
| 2001/0036153 A1 | 11/2001 | Sasaki et al. |
| 2002/0122410 A1 | 9/2002 | Kulikov et al. |
| 2003/0202524 A1 | 10/2003 | Conner et al. |
| 2004/0196853 A1 | 10/2004 | Saito et al. |
| 2008/0080364 A1 | 4/2008 | Barak et al. |
| 2009/0067378 A1 | 3/2009 | Luo et al. |
| 2009/0252065 A1 | 10/2009 | Zhang et al. |
| 2009/0270108 A1 | 10/2009 | Shugong |

(Continued)

FOREIGN PATENT DOCUMENTS

CN 101651971 A 2/2010

OTHER PUBLICATIONS

Kumagai et al. "Bit Significance Selective Frequency Diversity Transmission", 1996, pp. 910-914.*

(Continued)

*Primary Examiner* — Chirag Shah
*Assistant Examiner* — Jenkey Van
(74) *Attorney, Agent, or Firm* — Slater & Matsil, L.L.P.

(57) ABSTRACT

A system and method for transmitting control information are provided. A method for communications controller operations includes combining control data for each relay node of at least one relay node into a control channel data stream, mapping a plurality of transmission resources for the control channel data stream into a plurality of physical resource blocks using a distributed virtual resource mapping rule, and transmitting the plurality of physical resource blocks to the set of at least one relay node. The plurality of transmission resources are mapped to physical resource blocks that are non-contiguous in a frequency domain.

30 Claims, 7 Drawing Sheets

(56) References Cited

U.S. PATENT DOCUMENTS

2010/0034152 A1* 2/2010 Imamura ............... 370/329
2010/0046459 A1* 2/2010 Nishio et al. ............ 370/329
2011/0103292 A1* 5/2011 Pasad et al. ............. 370/315
2011/0164550 A1* 7/2011 Chen et al. ............. 370/315
2011/0243059 A1* 10/2011 Liu et al. ................ 370/315

OTHER PUBLICATIONS

"LTE; Evolved Universal Terrestrial Radio Access (E-UTRA); Physical Channels and Modulation," 3GPP TS 36.211, version 8.7.0, Release 8, Jun. 2009, 87 pages.

"3rd Generation Partnership Project; Technical Specification Group Radio Access Network; Evolved Universal Terrestrial Radio Access (E-UTRA); Physical Channels and Modulation (Release 9)," 3GPP TS 36.211, V9.1.0, Mar. 2010, 85 pages.

"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814, V9.0.0, Mar. 2010, 104 pages.

Notification of Transmittal of the International Search Report and the Written Opinion of the International Searching Authority, or the Declaration in corresponding International Application No. PCT/US 11/31784, dated Oct. 31, 2011, 16 pages.

Search Report issued in Chinese Application No. 201180007947X, 3 pages.

Office Action issued in Chinese Application No. 201180007947.X dated Dec. 4, 2013, 14 pages.

Potevio, "On the interference coordination intra-cell through R-PDCCH", R1-093444, 3GPP TSG RAN WG1 meeting #58, Agenda Item: 15.3, Shenzhen China, Aug. 24-28, 2009, 7 pages.

Samsung, "DL backhaul design for Type I relay", R1-094100, 3GPP TSG RAN WG1 Meeting #58bis, Agenda: 7.8.1, Miyazaki, Oct. 12-16, 2009, 4 pages.

ZTE, "R-PDCCH Multiplexing and Relevant Problems", R1-100975, TSG-RAN WG1 #60, Agenda Item: 7.5.1.2, San Francisco, USA, Feb. 22-26, 2010, 8 pages.

* cited by examiner

SYSTEM AND METHOD FOR TRANSMITTING CONTROL INFORMATION

This application claims the benefit of U.S. Provisional Application No. 61/322,730, filed on Apr. 9, 2010, entitled "R-PDCCH Configuration for FDM Multiplexing," which application is hereby incorporated herein by reference.

TECHNICAL FIELD

The present invention relates generally to digital communications, and more particularly to a system and method for transmitting control information.

BACKGROUND

A relay node (RN), or simply relay, is considered as a tool to improve, e.g., the coverage of high data rates, group mobility, temporary network deployment, the cell-edge throughput and/or to provide coverage in new areas. The RN is wirelessly connected to a wireless communications network via a donor cell (also referred to as a donor enhanced Node B (donor eNB or D-eNB)).

The donor eNB provides some of its own network resources for use by the RN. The network resources assigned to the RN may be controlled by the RN, as if the provided network resources were its own network resources.

Relaying is currently being discussed within the Third Generation Partnership Project (3GPP) Long Term Evolution (LTE) Radio Access Network One (RAN1) subgroup for standardization. In relaying, a Relay Physical Downlink Control Channel (R-PDCCH) may be used to signal control information from the D-eNB to the RN. However, in the 3GPP LTE technical standards, the R-PDCCH is not located within the control area of a subframe. Instead, the R-PDCCH is located within the data area of a subframe. Therefore, a widely discussed issue involves the multiplexing of the R-PDCCH with data channels in the data area of a subframe.

SUMMARY OF THE INVENTION

These technical advantages are generally achieved, by example embodiments of the present invention which provide a system and method for transmitting control information.

In accordance with an example embodiment of the present invention, a method for communications controller operations is provided. The method includes combining control data for each relay node of at least one relay node into a control channel data stream, mapping a plurality of transmission resources for the control channel data stream into a plurality of physical resource blocks using a distributed virtual resource mapping rule, and transmitting the plurality of physical resource blocks to the at least one relay node. The plurality of transmission resources are mapped to physical resource blocks that are non-contiguous in a frequency domain.

In accordance with another example embodiment of the present invention, a method for communications controller operations is provided. The method includes generating control data for each relay node of at least one relay node, multiplexing the control data for each relay node into a control channel data stream, and mapping a plurality of transmission resources for the control channel data stream into a plurality of physical resource blocks. The mapping for a subset of relay nodes of the at least one relay node is performed in accordance with a distributed virtual resource mapping rule where contiguous transmission resources are mapped to physical resource blocks that are non-contiguous in a frequency domain. The method also includes transmitting the plurality of physical resource blocks to the at least one relay node.

In accordance with another example embodiment of the present invention, a communications controller is provided. The communications controller includes a combiner, a mapping unit coupled to the combiner, and a transmitter coupled to the mapping unit. The combiner combines control data for each relay node of at least one relay node into a control channel data stream. The mapping unit maps the control channel data stream into a plurality of physical resource blocks using a distributed virtual resource mapping rule. Adjacent resource blocks in the control channel data stream are mapped to physical resource blocks that are non-contiguous in a frequency domain. The transmitter transmits the plurality of physical resource blocks to the at least one relay node.

One advantage disclosed herein is that frequency diversity is provided to help improve overall communications system performance.

A further advantage of exemplary embodiments is that network resource utilization is improved because of easy multiplexing of control and data channels. Therefore, network resources are used more efficiently, thereby reducing communications overhead.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a 3GPP LTE compliant communications system that supports RNs to help improve overall communications system performance. The invention may also be applied, however, to other communications systems, such as IEEE 802.16, WiMAX, and so forth, compliant communications systems that support the use of RNs to help improve overall communications system performance.

Figure 1:
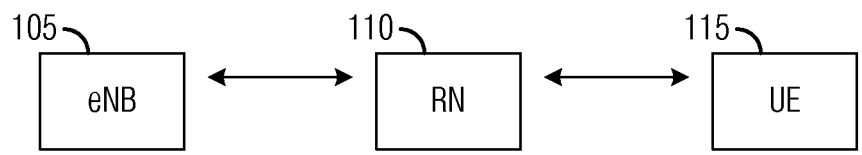
FIG. 1 illustrates an example communications system using RNs.

FIG. 1 illustrates a communications system 100 using RNs. Communications system 100 includes an eNB 105, a RN 110, and a UE 115. eNB 105 may control communications to UE, such as UE 115, as well as provide network resources to a RN, such as RN 110. As such, eNB 105 may be referred to as a D-eNB. eNB 105 may also be commonly referred to as a base station, communications controller, NodeB, enhanced NodeB, and so on, while UE 115 may be commonly referred to as a terminal, user, subscriber, mobile station, and so forth.

According to an example embodiment, RN 110 may receive transmissions from both eNB 105 and UE 115. RN 110 may then forward transmissions from UE 115 to eNB 105 and transmissions from eNB 105 to UE 115 (if they are so addressed).

Figure 2:
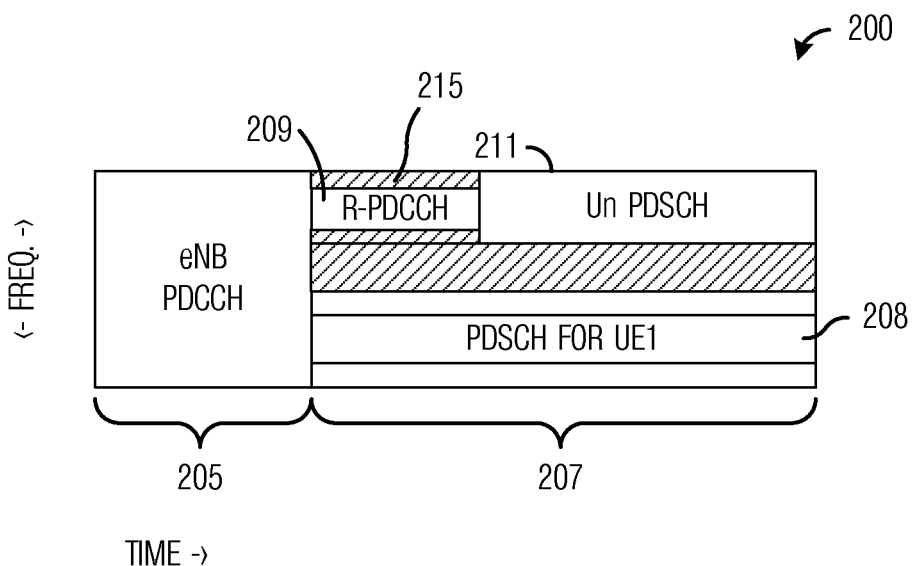
FIG. 2 illustrates an example frame structure for a downlink (DL) link transmission from an eNB to a RN according to example embodiments described herein.

FIG. 2 illustrates a frame structure for a downlink (DL) link 200 transmission from an eNB to a RN. DL link 200 includes a control region 205 and a data region 207. Note that in the frequency domain, the representation shown in FIG. 2 is logical, and does not necessarily represent the actual physical location in frequency of the various blocks. Although control region 205 is labeled as an eNB physical downlink control channel (PDCCH), control region 205 may contain other types of control channels or signals. Other types of control channels may include PCFICH, PHICH, and so forth, and other types of signals may include reference signals. Similarly, for simplicity data region 207 is shown with a physical downlink shared channel (PDSCH) 208. Since DL link 200 is also a DL relay backhaul link, DL link 200 includes some resource elements dedicated for use as the DL relay backhaul link, such as relay-physical downlink control channel (R-PDCCH) 209 and relay-physical downlink shared channel (R-PDSCH) 211, the R-PDSCH is also known as the Un PDSCH and will be referred to as such hereinafter. Although data region 207 is shown containing several types of channels, it may contain other channels and/or signals as well. The other types of signals may include reference signals.

In DL link 200, a RN does not know the exact location of its R-PDCCH. All it knows is that the R-PDCCH is located within a known set of resource blocks (RBs), commonly referred to as the R-PDCCH search space (an example of which is shown as search space 215). The R-PDCCH search space follows control region 205, occupying a set of subcarriers of one or several OFDM symbols in data region 207. Search space 215 may be specified by its frequency location. R-PDCCH 209 (if present) for the RN is located in the RN's search space 215. Search space 215 may be referred to as a virtual system bandwidth, which, in general, may be considered to be a set of resource blocks that can be semi-statically configured for potential R-PDCCH transmission. In other words, time domain parameters of the set of resource blocks may be semi-statically configured. Like a PDCCH in control region 205, R-PDCCH 209 provides information to support the transmission of DL and UL transport channel. R-PDCCH 209 may include information such as: resource assignment, modulation and coding system (MCS), Hybrid Automatic Repeat Request (HARM) information, and so on. That is, R-PDCCH 209 contains all the information for detecting and decoding a Relay Physical Downlink Shared Channel (R-PDSCH), also know as the Un PDSCH, and/or the Relay Physical Uplink Shared Channel (R-PUSCH), also known as the Un PUSCH.

The R-PDCCH may be multiplexed with the data channels, such as a Physical Downlink Shared Channel (PDSCH), a R-PDSCH, and so forth, with time division multiplexing (TDM), frequency division multiplexing (FDM), or a combination thereof.

Figure 3A:
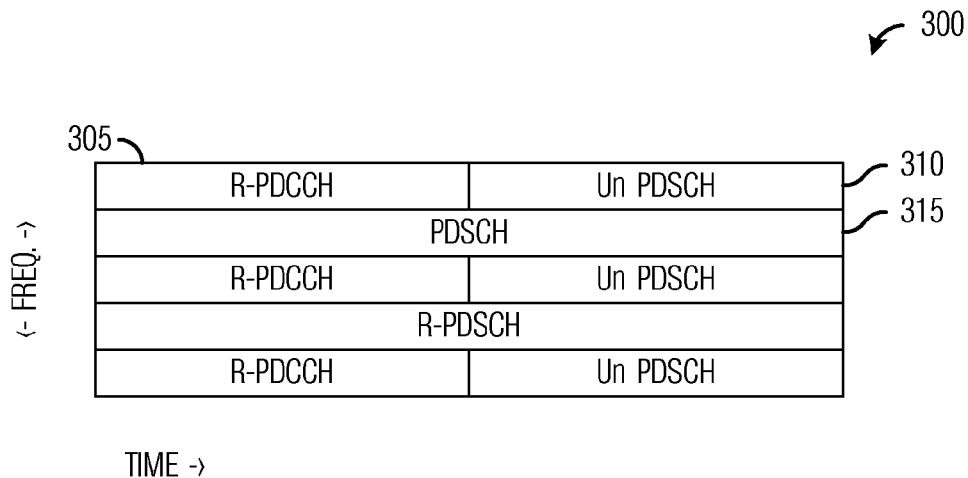
FIG. 3a illustrates an example data region wherein a R-PDCCH is TDM and FDM multiplexed with a R-PDSCH and a PDSCH according to example embodiments described herein.

FIG. 3a illustrates a data region 300 wherein a R-PDCCH is TDM and FDM multiplexed with a R-PDSCH and a PDSCH. As shown in FIG. 3a, a R-PDCCH 305 is TDM multiplexed with a Un PDSCH 310, while both R-PDCCH 305 and Un PDSCH 310 are FDM multiplexed with a PDSCH 315.

Although shown as being TDM multiplexed with R-PDSCH 310, R-PDCCH 305 may alternatively be TDM multiplexed with PDSCH 315. Similarly, R-PDCCH 305 and PDSCH 315 may be TDM multiplexed together and then FDM multiplexed with R-PDSCH 310. Generally, the channels may be TDM and/or FDM multiplexed in a wide number of ways, and FIG. 3a illustrates one such possible arrangement. Therefore, the illustrative example shown in FIG. 3a should not be construed as being limiting to either the scope or the spirit of the example embodiments.

Although shown in FIG. 3a as having substantially identical number of network resources, each instantiation of R-PDCCH, R-PDSCH, and PDSCH as they are multiplexed may be allocated a different number of network resources. Therefore, the illustrative example shown in FIG. 3a should not be construed as being limiting to either the scope or the spirit of the example embodiments.

Figure 3B:
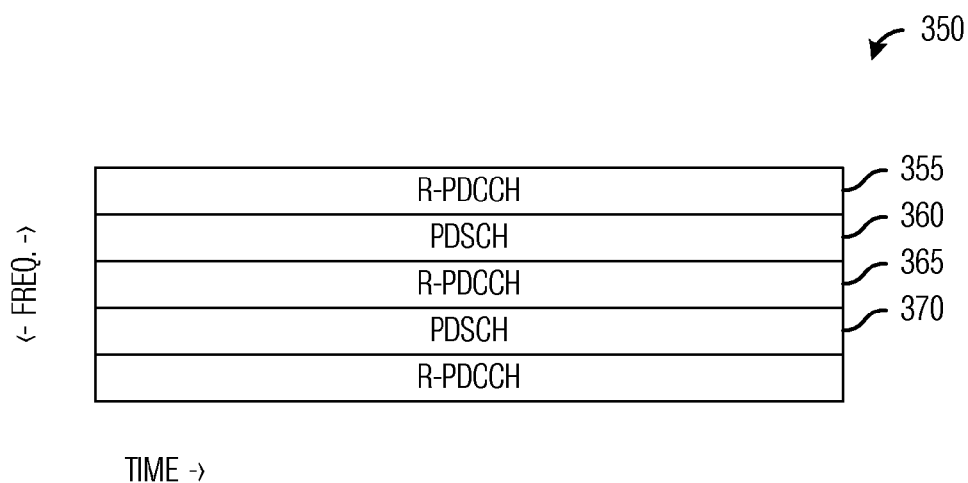
FIG. 3b illustrates an example data region wherein a R-PDCCH is FDM multiplexed with a PDSCH according to example embodiments described herein.

FIG. 3b illustrates a data region 350 wherein a R-PDCCH is FDM multiplexed with a PDSCH. As shown in FIG. 3b, a first R-PDCCH 355 may be FDM multiplexed with a first PDSCH 360. A second R-PDCCH 365 and a second PDSCH 370 may also be FDM multiplexed with first R-PDCCH 355 and first PDSCH 360.

Although shown in FIG. 3b as being substantially equal in size, i.e., allocated a same number of network resources, first R-PDCCH 355, second R-PDCCH 365, first PDSCH 360, second PDSCH 370, and so forth, may be allocated a different number of network resources. Therefore, the illustrative example shown in FIG. 3b should not be construed as being limiting to either the scope or the spirit of the example embodiments.

In practice, TDM multiplexing and FDM multiplexing of the R-PDCCH with data channel coexist and may be present at the same time, with some R-PDCCH time-multiplexed, and others frequency-multiplexed. It is also possible to have part of a R-PDCCH time-multiplexed and the remainder of the R-PDCCH frequency multiplexed, for example.

Figure 4A:
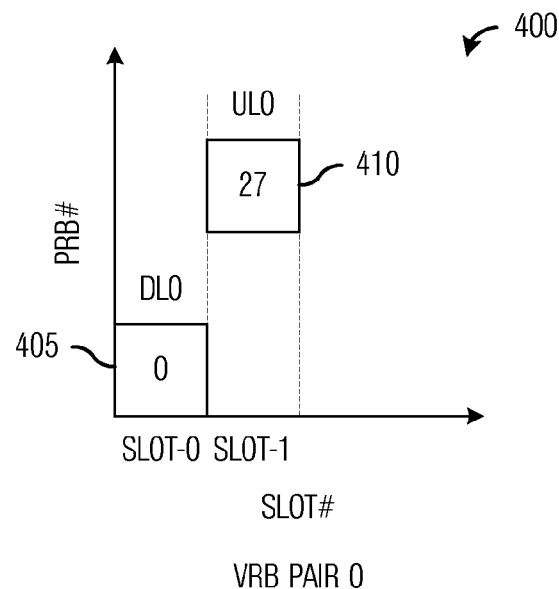
FIG. 4a illustrates an example resource block allocation for a virtual resource block pair according to example embodiments described herein.

FIG. 4a illustrates a resource block allocation 400 for a virtual resource block pair. An allocation resource blocks shown in FIG. 4a follow a distributed virtual resource block (DVRB) resource block allocation technique wherein virtual resource blocks are allocated to physical resource blocks that are non-contiguous in frequency to an extent (i.e., the physical resource blocks are far apart enough in frequency or the physical resource blocks are sufficiently separated in frequency) that typically, the frequency fading on two consecutive DVRBs is almost uncorrelated or that a correlation between two physical resource blocks are less than a threshold, such as 0.5. As an example, adjacent VRBs may be mapped to PRBs that are at least one-quarter to one-half or more of available PRBs away from each other.

By allocating the virtual resource blocks to physical resource blocks that are non-contiguous in frequency, frequency diversity may be achieved. As an example, in a single virtual resource block (VRB) pair #0, a first slot may be dedicated for use for control messages for the DL and a second slot may be dedicated for use for control messages for the UL. A first physical resource block (PRB), for example, PRB #0 405 of VRB pair #0 may be allocated as a VRB for control messages for the DL (a VRB of this type will be referred to as a DL-VRB hereinafter) and PRB #27 410 of VRB pair #0 may be allocated as a VRB for control messages for the UL (a VRB of this type will be referred to as a UL-VRB hereinafter).

Since only one VRB pair is allocated and only a single PRB is allocated for each VRB of the VRB pair and frequency diversity may not be fully exploited on either the DL-VRB or the UL-VRB.

Figure 4B:
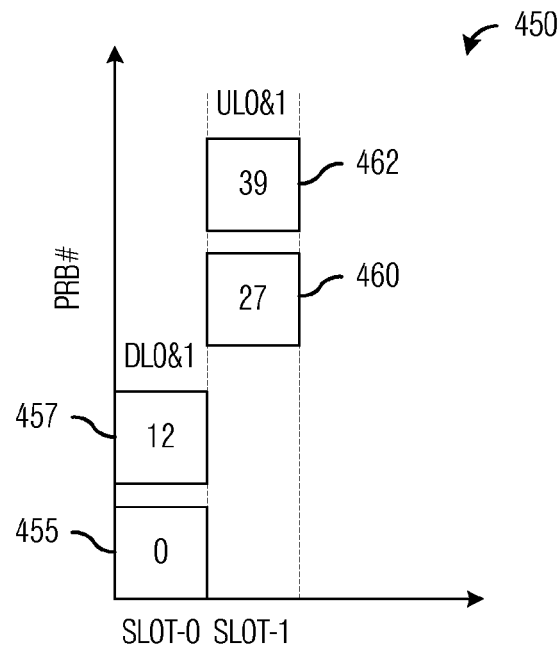
FIG. 4b illustrates an example resource block allocation for multiple resource block pairs according to example embodiments described herein.

FIG. 4b illustrates a resource block allocation 450 for multiple resource block pairs. As shown in FIG. 4b, two VRB pairs (pair #0 and pair #1) are allocated to PRBs. A first PRB (PRB #0 455) in the first slot may be allocated as a DL-VRB of VRB pair #0 and a second PRB (PRB #12 457) in the first slot may be allocated as a DL-VRB of VRB pair #1, while a first PRB (PRB #27 460) of the second slot may be allocated to an UL-VRB of VRB pair #0 and a second PRB (PRB #39 462) of the second slot may be allocated to an UL-VRB of VRB pair #1. The consecutive DVRB pairs may be allocated using messaging similar to downlink control information (DCI) format 2a.

Since more than one VRB pair is allocated, multiple PRBs widely separated in frequency may be used, thereby allowing the exploitation of frequency diversity to improve communications system performance. The frequency diversity gain may not arise from the slot hopping of DVRB but by the fact that consecutive DVRB pairs are spaced out in frequency.

Figure 5A:
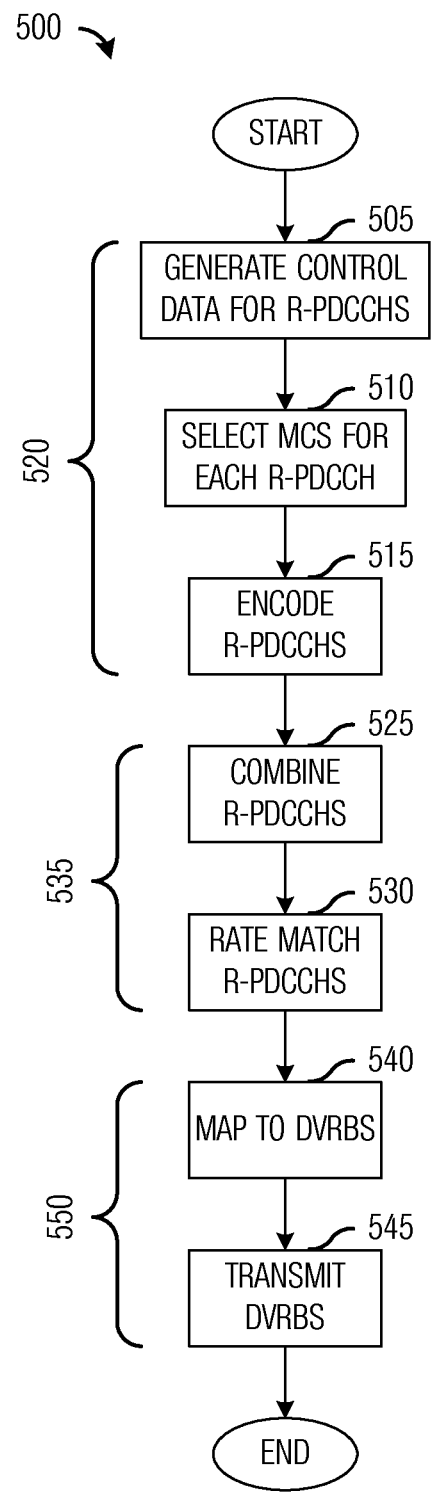
FIG. 5a illustrates an example flow diagram of D-eNB operations in transmitting R-PDCCHs to RN(s) according to example embodiments described herein.

FIG. 5a illustrates a flow diagram of D-eNB operations 500 in transmitting R-PDCCHs to RN(s). D-eNB operations 500 may be indicative of operations occurring in a D-eNB, such as D-eNB 105, as the D-eNB transmits control data to RN(s) coupled to the D-eNB. D-eNB operations 500 may occur while the D-eNB is in a normal operating mode and has RN(s) coupled to it.

D-eNB operations 500 may begin with the D-eNB generating control data for each RN coupled to the D-eNB (block 505). In general, there is a separate R-PDCCH for each RN coupled to the D-eNB. According to an example embodiment, the control data may include resource assignment, modulation and coding scheme (MCS), Hybrid Automatic Repeat Request (HARM) information, and so on.

The D-eNB may select a modulation and coding scheme (MCS) for each R-PDCCH (block 510). The D-eNB may select a MCS for each R-PDCCH in accordance with a set of selection criteria. Possible modulation may include QPSK, 16-QAM, 64-QAM, or any other modulation. The coding rate selected may be chosen, depending which modulation is used, so that the RN may receive its R-PDCCH with a reasonable probability of successful decoding.

The MCS selected for the RNs be all different or be all identical or a combination thereof. Examples of the set of selection criteria may include amount of control data to be transmitted, amount of network resources available per R-PDCCH, operating environment, communications system load, a quality of the communications channel between the D-eNB and the RNs, and so forth.

With the MCS selected for each RN, the D-eNB may encode each R-PDCCH in accordance with its selected MCS (block 515). However, the encoding may also be performed in accordance to other factors, including permissible codes, rates, and so forth. Collectively, generating control data (block 505), MCS selection (block 510), and R-PDCCH encoding (block 515) may be collectively referred to as preparing the R-PDCCH 520.

The D-eNB may combine the encoded R-PDCCHs together (block 525). According to an example embodiment, the D-eNB may multiplex the encoded control data from the individual R-PDCCHs into a single R-PDCCH. The multiplexing of the encoded control data may be performed using any of a variety of multiplexing techniques.

The D-eNB may also perform rate-matching for the R-PDCCH on an individual basis (block 530). Rate-matching may help to increase network resource utilization so that there is little or no network resource waste. Rate-matching helps to ensure that all resource elements (RE) of a resource block (RB) are occupied by matching a rate of the R-PDCCH with the rate of the resource elements of the resource blocks, thereby reducing or eliminating resource waste. Rate-matching may be optional. Collectively, combining R-PDCCHs (block 525) and rate-matching R-PDCCHs (block 530) may be referred to as generating the R-PDCCH 535.

The combined R-PDCCH, which may also be rate-matched, may then be mapped to VRBs based on a distributed virtual resource mapping rule to help utilize frequency diversity (block 540). The combined R-PDCCH comprises a plurality of transmission resources, which may be virtual resource blocks, or physical resource blocks. According to an example embodiment, the distributed virtual resource mapping rule may be any sort of distributed virtual resource mapping rule that maps consecutive DVRBs onto non-contiguous RBs that are sufficiently separated in the frequency domain so that frequency diversity may be exploited.

According to an example embodiment, the mapping may typically be achieved by allocating consecutive DVRBs since the DVRB mapping is designed to space RB out in the frequency domain. As discussed previously, utilizing the distributed virtual resource mapping rule in mapping the VRBs may help to exploit frequency diversity by placing adjacent VRBs non-contiguously in frequency to an extent so that two consecutive DVRB pairs experience weakly correlated frequency fading, which may be similar to DCI format 2a in the 3GPP LTE technical standards. As an example, adjacent VRBs may be mapped to PRBs that are at least one-quarter to one-half or more of available PRBs away from each other.

According to an example embodiment, the mapping rules may follow the 3GPP Technical Standards TS 36.211, Section 6.2.3.2, Virtual Resource Blocks of Distributed Type, which are summarized herein. For discussion purposes, consider that the communications system is N RB wide (e.g., if the bandwidth is 10 MHz, N would be 50). Furthermore, consider that a gap value is chosen, corresponding to $N_{gap}$ RBs, As discussed herein, the mapping is described for the large gap value, but extension to the small gap values is straightforward. The mapping rule is as follows: first, the DVRB pairs are numbered from 0 to $N_{VRB}^{DL}-1$, with $N_{VRB}^{DL}=N_{VRB,gap1}^{DL}=2\cdot\min(N_{gap}, N_{RB}^{DL}-N_{gap})$. Consecutive $\tilde{N}_{VRB}^{DL}$ VRB numbers compose a unit of VRB number interleaving, where $\tilde{N}_{VRB}^{DL}=N_{VRB}^{DL}$. Interleaving of VRB numbers of each interleaving unit is performed with 4 columns and $N_{row}$, where $N_{row}=\lceil N_{VRB}^{DL}/(4P)\rceil \cdot P$, and P is Resource Block Group size. VRB numbers are written row by row in the rectangular matrix, and read out column by column. $N_{null}$ nulls are inserted in the last $N_{null}/2$ rows of the $2^{nd}$ and $4^{th}$ column, where $N_{null}=4N_{row}-\tilde{N}_{VRB}^{DL}$. Nulls are ignored when reading out. The VRB numbers mapping to PRB numbers including interleaving is derived as follows:

For Even Slot Number $n_s$;

$$\tilde{n}_{PRB}(n_s) = \begin{cases} \tilde{n}'_{PRB} - N_{row}, & N_{null} \neq 0 \text{ and } \tilde{n}_{VRB} \geq \tilde{N}_{VRB}^{DL} - N_{null} \text{ and } \tilde{n}_{VRB} \bmod 2 = 1 \\ \tilde{n}'_{PRB} - N_{row} + N_{null}/2, & N_{null} \neq 0 \text{ and } \tilde{n}_{VRB} \geq \tilde{N}_{VRB}^{DL} - N_{null} \text{ and } \tilde{n}_{VRB} \bmod 2 = 0 \\ \tilde{n}''_{PRB} - N_{null}/2, & N_{null} \neq 0 \text{ and } \tilde{n}_{VRB} < \tilde{N}_{VRB}^{DL} - N_{null} \text{ and } \tilde{n}_{VRB} \bmod 4 \geq 2 \\ \tilde{n}''_{PRB}, & \text{otherwise,} \end{cases}$$

where $\tilde{n}_{PRB}'=2N_{row}\cdot(\tilde{n}_{VRB} \bmod 2)+\lfloor\tilde{n}_{VRB}/2\rfloor+\tilde{N}_{VRB}^{DL}\cdot\lfloor n_{VRB}/\tilde{N}_{VRB}^{DL}\rfloor$,
and $\tilde{n}_{PRB}''=N_{row}\cdot(\tilde{n}_{VRB} \bmod 4)+\lfloor\tilde{n}_{VRB}/4\rfloor+\tilde{N}_{VRB}^{DL}\cdot\rfloor$,
where $\tilde{n}_{VRB}=n_{VRB} \bmod \tilde{N}_{VRB}^{DL}$ and $n_{VRB}$ is obtained from the downlink scheduling assignment.

For Odd Slot Number $n_s$;

$$\tilde{n}_{PRB}(n_s) = (\tilde{n}_{PRB}(n_s-1)+\tilde{N}_{VRB}^{DL}/2) \bmod \tilde{N}_{VRB}^{DL} + \tilde{N}_{VRB}^{DL}\cdot\lfloor n_{VRB}/\tilde{N}_{VRB}^{DL}\rfloor.$$

Then, for all $n_s$;

$$n_{PRB}(n_s) = \begin{cases} \tilde{n}_{PRB}(n_s), & \tilde{n}_{PRB}(n_s) < \tilde{N}_{VRB}^{DL}/2 \\ \tilde{n}_{PRB}(n_s) + N_{gap} - \tilde{N}_{VRB}^{DL}/2, & \tilde{n}_{PRB}(n_s) \geq \tilde{N}_{VRB}^{DL}/2. \end{cases}$$

Figure 5B:
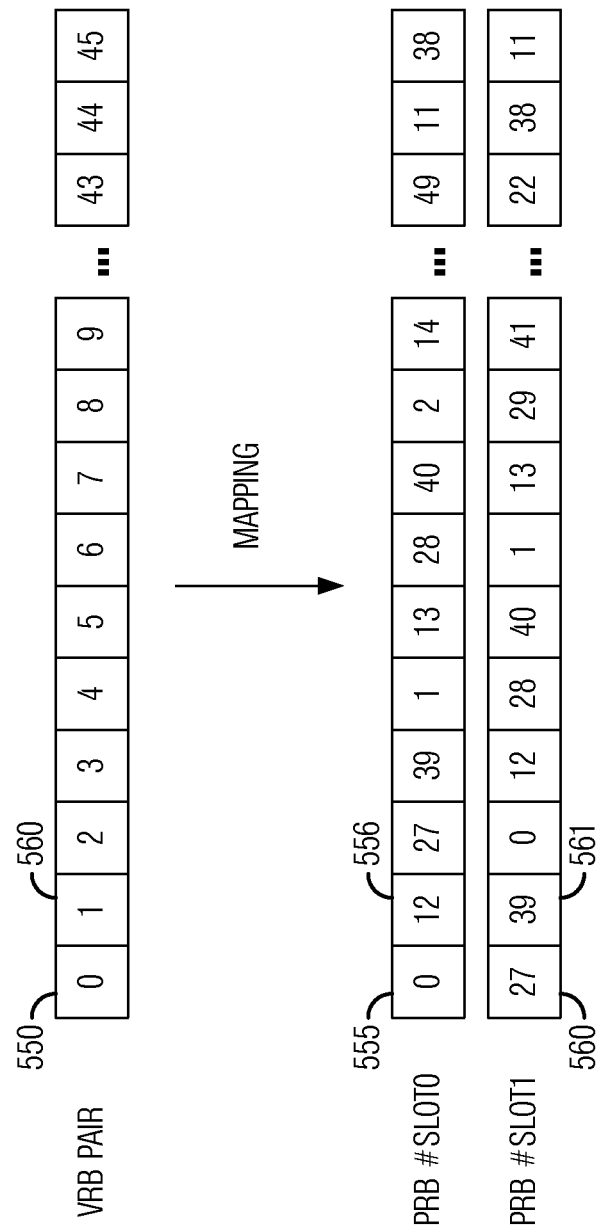
FIG. 5b illustrates an example of a portion of an exemplary mapping for a communications system occupying 50 RBs per 10 MHz according to example embodiments described herein.

FIG. 5b illustrates a portion of an exemplary mapping for a communications system occupying 50 RBs per 10 MHz. As shown in FIG. 5b, there are a total of 45 available DVRB pairs. As an example, DVRB 0 550 occupies PRB 0 555 on the first slot and PRB 12 556 on the second slot, DVRB 1 560 occupies PRB 27 560 on the first slot and PRB 39 561 on the second slot, and so on.

Returning now to FIG. 5a, the VRBs may be transmitted (block 545). According to an example embodiment, the VRBs may be broadcast. The VRBs, which contain the combined R-PDCCH may be transmitted and the RNs may search in a search space to find their own R-PDCCH. Collectively, mapping to DVRBs (block 540) and transmitting DVRBs (block 545) may be referred to as transmitting the R-PDCCH 550.

Figure 6:
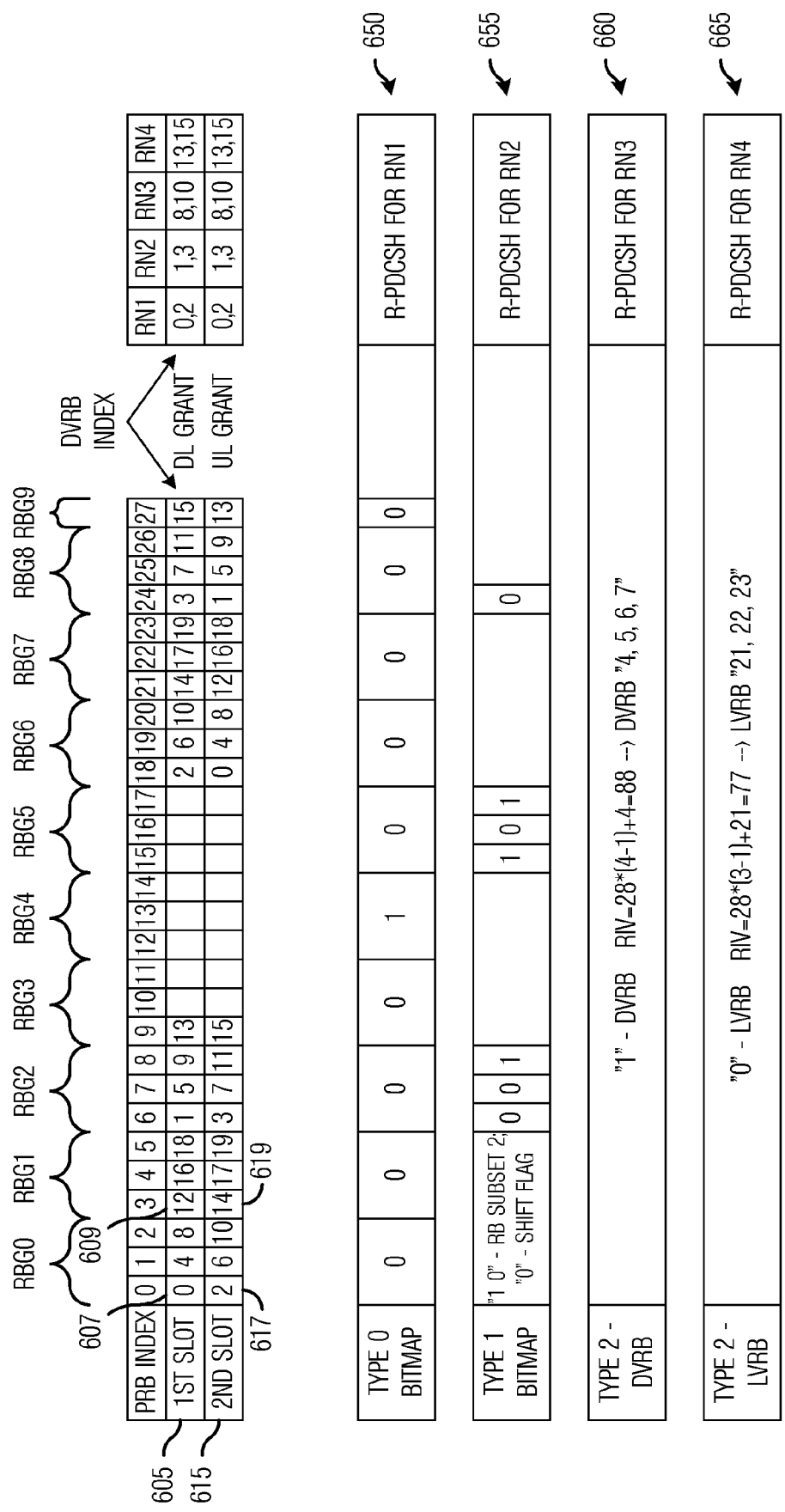
FIG. 6 illustrates an example mapping of LRBs to PRBs using DVRB allocation according to example embodiments described herein.

FIG. 6 illustrates an exemplary mapping of LRBs to PRBs using DVRB allocation. As shown in FIG. 6, adjacent VRB of different resource block groups (RBG) may be mapped to PRBs that are spaced out in frequency, thereby exploiting frequency diversity. As an example, VRB 0 of RBG0 is mapped to PRB #0 607 and VRB 0 of RBG1 is mapped to PRB #12 609 and VRB 0 of RBG0 is mapped to PRB #2 617 and VRB 0 of RBG1 is mapped to PRB #14 619.

As is also shown in FIG. 6, it is possible for the eNB to multiplex this type of R-PDCCH allocation with other type of resource allocations for Un PDSCH. For instance, the Un PDSCH for RN1 may use a type 0 allocation (shown as sequence 650), the Un PDSCH for RN2 may use a type 1 allocation (shown as sequence 655), the Un PDSCH for RN3 may use a type 2 localized allocation (shown as sequence 660), and the Un PDSCH for RN4 may use a type 2 distributed allocation (shown as sequence 665). When performed carefully, the different allocations can coexist at the same time with minimal or no resource waste.

Figure 7:
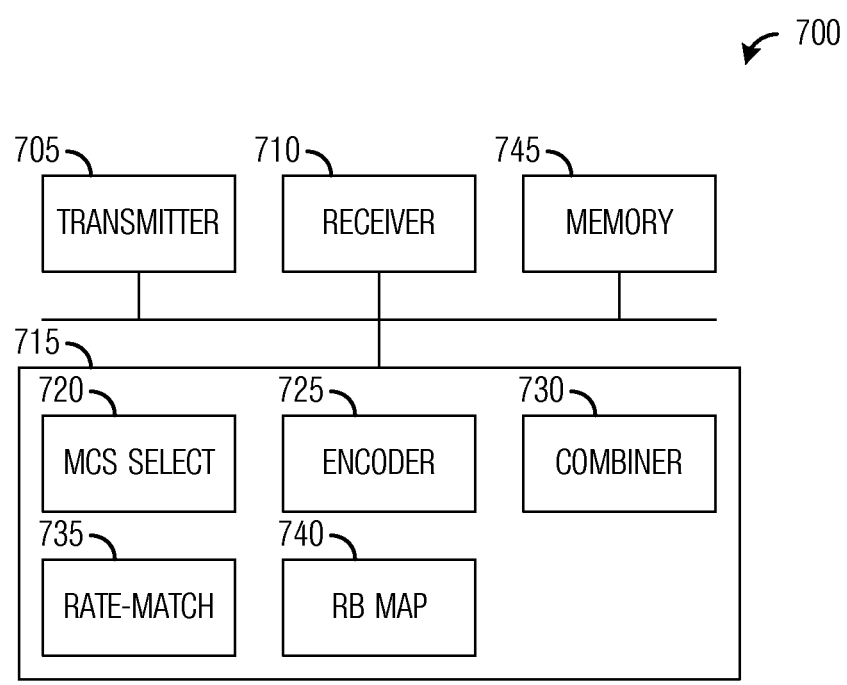
FIG. 7 illustrates an example communications device according to example embodiments described herein.

FIG. 7 provides an alternate illustration of a communications device 700. Communications device 700 may be an implementation of a D-eNB. Communications device 700 may be used to implement various ones of the embodiments discussed herein. As shown in FIG. 7, a transmitter 705 is configured to transmit information and a receiver 710 is configured to receive information.

A MCS select unit 720 is configured to select an MCS for each R-PDCCH coupled to communications device 700. An encoder 725 is configured to encode control data in each R-PDCCH. A combiner 730 is configured to combine control data from each R-PDCCH into a combined R-PDCCH. A rate-match unit 735 is configured to perform rate-matching for the control data in the combined R-PDCCH. An RB map unit 740 is configured to map LRBs to VRBs, preferably in accordance with a distributed virtual resource mapping rule to exploit frequency diversity. A memory 745 is configured to store information, such as possible MCS, permissible mappings, and so on.

The elements of communications device 700 may be implemented as specific hardware logic blocks. In an alternative, the elements of communications device 700 may be implemented as software executing in a processor, controller, application specific integrated circuit, or so on. In yet another alternative, the elements of communications device 700 may be implemented as a combination of software and/or hardware.

As an example, transmitter 705 and receiver 710 may be implemented as a specific hardware block, while MCS selection unit 720, encoder 725, combiner 730, rate-match unit 735, and RB map unit 740 may be software modules executing in a microprocessor (such as processor 715), a custom circuit, a custom compiled logic array of a field programmable logic array, or combinations thereof.

The above described embodiments of communications device 700 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIG. 5a—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications controller operations, the method comprising:
    combining control data for each relay node of a plurality of relay nodes into a control channel data stream for a data region of a frame structure, wherein the control data for each relay node comprises a downlink control message, wherein the control data for one or more relay nodes of the plurality of relay nodes further comprises an uplink control message, and wherein combining the control data into the control channel data stream comprises:
        combining the downlink control message of the control data for each relay node into a downlink portion of the control channel data stream; and
        combining the uplink control message of the control data for the one or more relay nodes into an uplink portion of the control channel data stream;
    mapping a plurality of first transmission resources for the downlink portion of the control channel data stream to a plurality of first physical resource blocks using a distributed virtual resource mapping rule, wherein the plurality of first transmission resources are mapped to first physical resource blocks that are non-contiguous in a frequency domain;
    separately mapping a plurality of second transmission resources for the uplink portion of the control channel data stream to a plurality of second physical resource blocks using the distributed virtual resource mapping rule, wherein the plurality of second transmission resources are mapped to second physical resource blocks that are non-contiguous in the frequency domain;
    rate-matching the control data in the control channel data stream with the plurality of first and second physical resource blocks; and
    transmitting the plurality of first and second physical resource blocks to the plurality of relay nodes.

2. The method of claim 1, wherein the distributed virtual resource mapping rule comprises a mapping rule that maps consecutive transmission resources in the control channel data stream onto non-contiguous physical resource blocks that are sufficiently separated in the frequency domain to allow for an exploitation of frequency diversity.

3. The method of claim 1, wherein the plurality of first transmission resources comprises third physical resource blocks.

4. The method of claim 1, wherein the plurality of first transmission resources comprises virtual resource blocks.

5. The method of claim 1, wherein the plurality of first transmission resources comprises at least one slot of a resource block.

6. The method of claim 1, further comprising selecting a modulation and coding scheme for each relay node.

7. The method of claim 6, further comprising encoding the control data for each relay node in accordance with the selected modulation and coding scheme for the relay node.

8. The method of claim 6, wherein the selecting a modulation and coding scheme for the relay node is in accordance with an amount of control data to be transmitted by the relay node, an amount of network resources available for the control data of the relay node, an operating environment of the relay node, a load of a communications system containing the at least one relay node, a quality of a communications channel between the relay node and a communications controller serving the relay node, or combinations thereof.

9. The method of claim 1, wherein combining control data comprises multiplexing the control data.

10. The method of claim 1, wherein the plurality of first transmission resources comprises a plurality of virtual resource blocks, and wherein mapping the plurality of first transmission resources comprises mapping adjacent virtual resource blocks to first physical resource blocks that are non-contiguous in the frequency domain.

11. The method of claim 10, wherein the adjacent virtual resource blocks are mapped to first physical resource blocks that are at least one-quarter of a total number of physical resource blocks apart.

12. The method of claim 10, wherein the adjacent virtual resource blocks are mapped to first physical resource blocks that are at least one-half of a total number of physical resource blocks apart.

13. The method of claim 10, wherein two physical resource blocks are non-contiguous in frequency to an extent such that a frequency fading between the two physical resource blocks are uncorrelated.

14. The method of claim 10, wherein the adjacent virtual resource blocks are mapped to first physical resource blocks that are non-adjacent physical resource blocks.

15. The method of claim 10, wherein the adjacent virtual resource blocks are mapped to first physical resource blocks that are sufficiently separated in frequency such that a correlation of the frequency fading between any two physical resource blocks are less than a threshold.

16. The method of claim 15, wherein the threshold is 0.5.

17. A method for communications controller operations, the method comprising:
    generating control data for each relay node of a plurality of relay nodes, wherein the control data for each relay node comprises a downlink control message, and wherein the control data for one or more relay nodes of the plurality of relay nodes further comprises an uplink control message;
    multiplexing the control data for each relay node into a control channel data stream for a data region of a frame structure, wherein multiplexing the control channel data stream comprises:
        multiplexing the downlink control message of the control data for each relay node into a downlink portion of the control channel data stream; and multiplexing the uplink control message of the control data for the one or more relay nodes into an uplink portion of the control channel data stream;

mapping a plurality of first transmission resources for the downlink portion of the control channel data stream into the data region of a plurality of first physical resource blocks, wherein contiguous first transmission resources are mapped to first physical resource blocks that are non-contiguous in a frequency domain;

mapping a plurality of second transmission resources for the uplink portion of the control channel data stream into the data region of a plurality of second physical resource blocks, wherein contiguous second transmission resources are mapped to second physical resource blocks that are non-contiguous in the frequency domain, wherein mapping the plurality of first transmission resources is separate from mapping the plurality of second transmission resources, and wherein the mapping for a subset of relay nodes of the plurality of relay nodes is performed in accordance with a distributed virtual resource mapping rule;

rate-matching the control data in the control channel data stream with the plurality of first and second physical resource blocks; and transmitting the plurality of first and second physical resource blocks to the plurality of relay nodes.

18. The method of claim 17, wherein transmission resources for different relay nodes are mapped to the physical resource blocks in accordance with different mapping rules.

19. The method of claim 17, wherein the distributed virtual resource mapping rule comprises mapping rules as specified in 3GPP Technical Standards TS 36.211 version 9.1.0, Section 6.2.3.2: Virtual Resource Blocks of Distributed Type.

20. The method of claim 17, further comprising selecting a modulation and coding scheme for each relay node in the at least one relay nodes.

21. The method of claim 17, wherein mapping the plurality of first and second transmission resources in the control channel data stream follows a Third Generation Partnership Project Long Term Evolution Downlink Control Information Format 2 format.

22. The method of claim 21, wherein control information for the Third Generation partnership Project Long Term Evolution Downlink Control Information Format 2 format is distributed to the non-contiguous first and second physical resource blocks.

23. The method of claim 17, wherein two physical resource blocks are non-contiguous in frequency such that the frequency fading between the two physical resource blocks are uncorrelated.

24. The method of claim 17, wherein adjacent transmission resources in the control channel data stream are mapped to non-adjacent physical resource blocks.

25. The method of claim 17, wherein contiguous transmission resources are mapped to physical resource blocks that are sufficiently separated in frequency such that correlation of the frequency fading between any two physical resource blocks are less than a threshold.

26. A communications controller comprising:
a combiner configured to combine control data for each relay node of a plurality of relay node into a control channel data stream for a data region of a frame structure, wherein the control data for each relay node comprises a downlink control message, wherein the control data for one or more relay nodes of the plurality of relay nodes further comprises an uplink control message, and wherein the combiner is further configured to:
combine the downlink control message of the control data for each relay node into a downlink portion of the control channel data stream; and
combine the uplink control message of the control data for the one or more relay nodes into an uplink portion of the control channel data stream;

a mapping unit coupled to the combiner, the mapping unit configured to:
map a plurality of first transmission resources for the downlink portion of the control channel data stream into the data region of a plurality of first physical resource blocks using a distributed virtual resource mapping rule, wherein adjacent resource blocks in the plurality of first transmission resources are mapped to first physical resource blocks that are non-contiguous in a frequency domain; and
separately map a plurality of second transmission resources for the uplink portion of the control channel data stream into the data region of a plurality of second physical resource blocks using the distributed virtual resource mapping rule, wherein adjacent resource blocks in the plurality of second transmission resources are mapped to second physical resource blocks that are non-contiguous in the frequency domain;

a rate-match unit coupled to the combiner, the rate-match unit configured to rate-match the control data in the control channel data stream with the plurality of first and second physical resource blocks; and a transmitter coupled to the mapping unit, the transmitter configured to transmit the plurality of first and second physical resource blocks to the plurality of relay nodes.

27. The communications controller of claim 26, further comprising a modulation and coding scheme select unit coupled to the combiner, the modulation and coding scheme select unit configured to select a modulation and coding scheme for each relay node.

28. The communications controller of claim 27, further comprising an encoder coupled to the modulation and coding scheme select unit, the encoder configured to encode the control data for each relay node in accordance with the selected modulation and coding scheme for the relay node.

29. The communications controller of claim 26, wherein the control channel data stream comprises a plurality of virtual resource blocks, and wherein the mapping unit is configured to map adjacent virtual resource blocks to physical resource blocks that are non-contiguous in the frequency domain.

30. The communications controller of claim 29, wherein the adjacent virtual resource blocks are mapped to physical resource blocks that are at least one-quarter of a total number of physical resource blocks apart.

* * * * *